US010682937B2

(12) United States Patent
Jockel et al.

(10) Patent No.: US 10,682,937 B2
(45) Date of Patent: Jun. 16, 2020

(54) PROTECTION ELEMENT FOR A VEHICLE SEAT, VEHICLE SEAT

(71) Applicant: VOLKSWAGEN AKTIENGESELLSCHAFT, Wolfsburg (DE)

(72) Inventors: Fabian Jockel, Braunschweig (DE); Tina Bauer, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 36 days.

(21) Appl. No.: 15/575,511

(22) PCT Filed: Aug. 31, 2016

(86) PCT No.: PCT/EP2016/070447
§ 371 (c)(1),
(2) Date: Nov. 20, 2017

(87) PCT Pub. No.: WO2017/037077
PCT Pub. Date: Mar. 9, 2017

(65) Prior Publication Data
US 2018/0162246 A1    Jun. 14, 2018

(30) Foreign Application Priority Data

Sep. 1, 2015    (DE) .................. 10 2015 216 704

(51) Int. Cl.
*B60N 2/66* (2006.01)
*B60N 2/68* (2006.01)
*B60N 2/70* (2006.01)

(52) U.S. Cl.
CPC .............. *B60N 2/667* (2015.04); *B60N 2/68* (2013.01); *B60N 2/682* (2013.01); *B60N 2/7041* (2013.01); *B60N 2/7047* (2013.01)

(58) Field of Classification Search
CPC .......... B60N 2/667; B60N 2/68; B60N 2/682; B60N 2/7041; B60N 2/7047
See application file for complete search history.

(56) References Cited

U.S. PATENT DOCUMENTS

| 2,096,822 A | 10/1937 | Oldham |
| 5,518,294 A * | 5/1996 | Ligon, Sr. ............ B60N 2/6673 |
| | | 297/284.4 |

(Continued)

FOREIGN PATENT DOCUMENTS

| CN | 102476600 A | 5/2012 |
| DE | 4224063 A1 | 1/1993 |

(Continued)

OTHER PUBLICATIONS

Search Report for German Patent Application No. 10 2015 216 704.6, dated Jun. 7, 2016.

(Continued)

*Primary Examiner* — David R Dunn
*Assistant Examiner* — Tania Abraham
(74) *Attorney, Agent, or Firm* — Barnes & Thornburg LLP

(57) ABSTRACT

A tarpaulin-shaped protection element for a backrest of a vehicle seat having at least one securing hook in a single piece with the protection element and which is used to secure the protection element to a strut structure of a vehicle seat. The protection element includes at least one cut-away tab bent outwards from a plane of the protection element and has a free end for forming the securing hook. The tab includes a retaining section for blocking the tab on the strut structure.

20 Claims, 3 Drawing Sheets

(56) References Cited

U.S. PATENT DOCUMENTS

Figure 1:
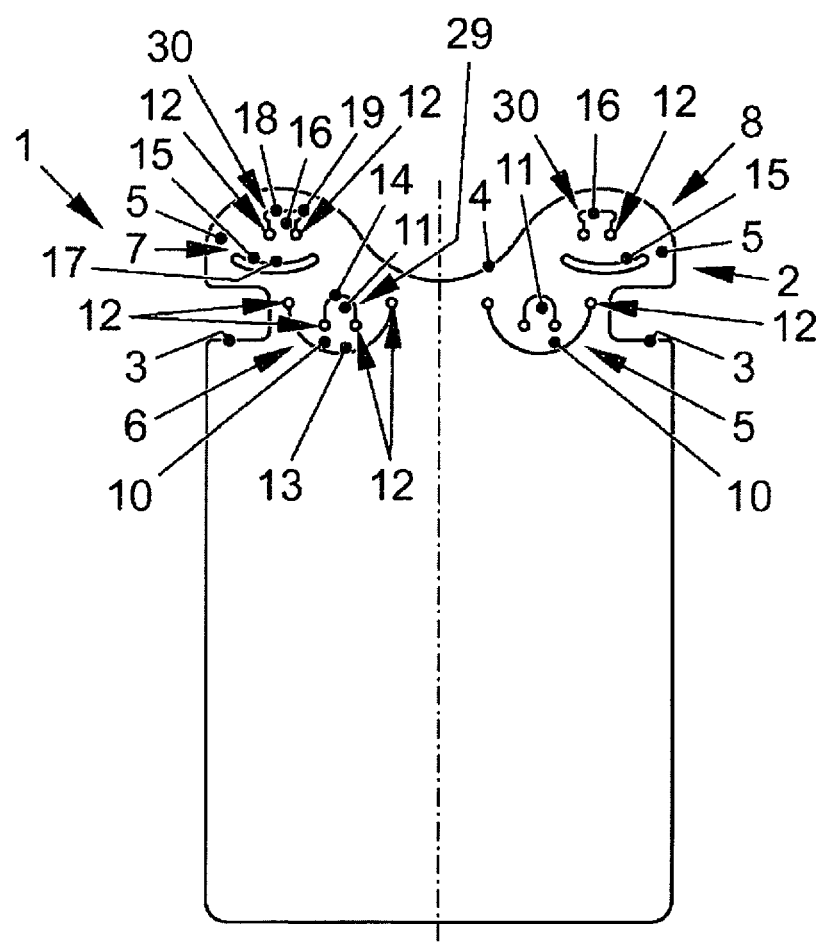

| | | | |
|---|---|---|---|
| 5,884,968 A * | 3/1999 | Massara | B60N 2/23 |
| | | | 297/216.12 |
| 6,682,144 B2 * | 1/2004 | Klingler | B60N 2/6671 |
| | | | 297/284.4 |
| 7,131,694 B1 * | 11/2006 | Buffa | B60N 2/6671 |
| | | | 297/284.4 |
| 2006/0244293 A1 | 11/2006 | Buffa | |
| 2012/0133183 A1 * | 5/2012 | Kim | B60N 2/667 |
| | | | 297/284.4 |
| 2013/0119724 A1 | 5/2013 | Adachi et al. | |
| 2015/0032037 A1 | 1/2015 | Nakano et al. | |

FOREIGN PATENT DOCUMENTS

| | | |
|---|---|---|
| DE | 10239740 A1 | 3/2004 |
| DE | 102006049688 A1 | 4/2008 |
| EP | 0698360 A1 | 2/1996 |

OTHER PUBLICATIONS

Search Report for International Patent Application No. PCT/EP2016/070447, dated Nov. 24, 2016.

Office Action for Chinese Patent Application No. 201680050730, dated Aug. 12, 2019.

\* cited by examiner

PROTECTION ELEMENT FOR A VEHICLE SEAT, VEHICLE SEAT

PRIORITY CLAIM

This patent application is a U.S. National Phase of International Patent Application No. PCT/EP2016/070447, filed 31 Aug. 2016, which claims priority to German Patent Application No. 10 2015 216 704.6, filed 1 Sep. 2015, the disclosures of which are incorporated herein by reference in their entireties.

SUMMARY

Illustrative embodiments relate to a tarpaulin-like protection element for a backrest of a vehicle seat, comprising at least one fastening hook which is configured integrally with the protection element for fastening the protection element to a strut structure of the vehicle seat, wherein the fastening hook of the protection element is formed by at least one tab of the protection element which is cut away and which is bent outwardly in a resilient manner from a plane of the protection element.

Illustrative embodiments further relate to a vehicle seat for a motor vehicle comprising a backrest which has such a protection element.

BRIEF DESCRIPTION OF THE DRAWINGS

The disclosed embodiments are described hereinafter in more detail with reference to the drawings, in which:

FIG. 1 shows a protection element for a vehicle seat in a plan view;

FIG. 2 shows a vehicle seat with the protection element mounted therein;

FIG. 3 shows a further view of the vehicle seat;

FIG. 4 shows a further vehicle seat with the protection element mounted thereon; and FIG. 5 shows the further vehicle seat in a further view.

DETAILED DESCRIPTION

Protection elements and vehicle seats of the type mentioned in the introduction are known from the prior art. A protection element having the features of the preamble of claim 1 has already been disclosed in the published patent application DE 10 2006 0049 688 A1. The protection element has a central cut-away tab which is able to be bent outwardly from the plane of the protection element to be fastened to a seat structure of a backrest.

Moreover, the published patent application DE 42 24 063 A1 discloses a vehicle seat, a tarpaulin-like protection element being arranged in the backrest thereof, the protection element being configured as a woven resilient structure and being fastened to the vehicle seat by metal mounting clips on the edge side, which in this context represent fastening hooks. The protection element in this context is configured as a multipart component consisting of the woven fabric and the mounting clips.

A further protection element which is also configured to be tarpaulin-like and to be resiliently deformable and is fastened by fastening hooks to struts of the vehicle seat is disclosed in the published patent application US 2015/0032037 A1. Here, the fastening hooks are integrally configured with the protection element and protrude therefrom at right angles so that in each case they are able to receive a portion of a strut for the fastening thereof. In this case, therefore, the protection element has a three-dimensional basic structure with a tarpaulin-like basic element and fastening hooks protruding therefrom. A similar protection element has also already been disclosed in the published patent application US 2013/0119724 A1.

Disclosed embodiments provide an improved protection element which provides a more secure retention of the protection element on the strut structure of the vehicle seat.

This is achieved by a protection element. Its use is flexible in comparison with previously known solutions, since fixed fastening hooks which are not suitable for every constructional space and/or vehicle seat design are avoided, wherein it is nevertheless ensured that a secure fastening is ensured by the fastening hooks of the protection element on a vehicle seat. According to the disclosed embodiments, to this end it is provided that the tab comprises an additional retaining portion for blocking the tab on the strut structure. The disclosed embodiments, therefore, provide that at least one tab is cut away in the protection element. Thus in its initial state the tab is located in the plane of the tarpaulin-like protection element and thus does not project therefrom and/or project outwardly therefrom. Due to the cut-away portion, however, the tab may be bent outwardly from the plane of the protection element and/or from the protection element to form the fastening hook thereby. To this end, the tab merely has to be bent outwardly to a sufficient extent that a receiver space is formed between the tab and the remaining protection element into which the strut may be inserted. The tab only protrudes from the protection element when it is required. If no strut is present at the point where the tab is formed, or no fastening of the protection element is provided on the vehicle seat, in its initial position the tab is able to remain in the plane of the protection element and thus is optimally adapted to the available constructional space of the vehicle seat. Because of the retaining portion, the tab is also able to be fastened securely to the strut structure, such that an inadvertent release of the protection element from the strut structure is reliably prevented. The additional retaining portion is configured such that it engages behind the strut structure which is received between the tab and the protection element, so that at the tab the strut structure is also held between the tab and the retaining portion. As a result, the tab is held positively on the strut structure such that it is only able to be displaced in the direction of the strut structure but is not able to be displaced transversely thereto. Expediently, the protection element has a plurality of such tabs which, depending on the vehicle seat to which the protection element is intended to be fastened, are bent outwardly or left in their initial position. As a result, a high degree of versatility of the protection element is permitted even in different vehicle seats and at the same time a simple and secure mounting of the protection element is ensured. Moreover, since the tabs are cut away a simple production of the protection element, which is able to be implemented in a time-efficient and cost-effective manner, is provided. Also, by the design of the disclosed protection element, it is achieved that a plurality of protection elements may be simply stored and transported by being superimposed, the tabs thereof being located in their initial position, whereby the handling of the protection elements is simplified.

According to a disclosed embodiment, it is provided that the tab is configured to be at least partially resiliently deformable. As a result, the tab may be bent outwardly in a simple manner from its initial position and/or from its relaxed resting position in the protection element into the position of use, forming the fastening hooks. Because of the resilience, it is also achieved that the mounting of the protection element on the vehicle seat may be carried out in a simple manner and without clearance.

The protection element is configured as a whole to be resiliently deformable, whereby the resilient deformability of the tab is ensured. Alternatively or additionally, the protection element may be manufactured from a puncture-resistant material to ensure a high degree of protection against the vehicle seat being punctured, for example, when used in a police vehicle or taxi.

According to a disclosed embodiment, it is provided that the tab is cut away in an arcuate manner. As a result, corners or edges which could result in the tab being undesirably bent outwardly during mounting are avoided. Moreover, forces which are present during the resilient deformation of the tab are absorbed by the protection element. Moreover, a simple threading of a strut between the tab which is bent outwardly and the protection element is ensured by the arcuate shape. It is provided that the tab is cut away in an at least substantially U-shaped manner. This results in the benefits already cited above. Moreover, the U-shape results in the benefit that even with a smaller radius of the arcuate shape the tab may be configured to be relatively long so that even in the case of a narrow design of the tab a strut is able to be securely received between the tab and the protection element.

Moreover, the tab at its free end may comprise a tab head which is wider than the remaining tab and forms the retaining portion. As a result, the tab head forms a portion which may also engage behind the strut during mounting, whereby the load-bearing capacity of the fastening is further increased by the fastening hook formed by the tab. The widened tab head and/or the retaining portion forms, in particular, a type of barb which permits the tab, for example, to be inserted into a corresponding mating piece and to be latched there, such as for example, into a slot-shaped opening in a housing part of the vehicle seat. Because of the widened tab head, therefore, the additional retaining portion of the tab is provided in a simple manner.

According to a disclosed embodiment, it is provided that the protection element comprises at least one pair of two of the cut-away tabs, wherein the free ends of the opposingly arranged tabs face in opposing directions in the relaxed resting state of the tabs in the protection element. Because of this design of the tab pairs, it is achieved that receiver pockets which are accessible from opposing directions are formed, so that when both receiver pockets are used for receiving a strut of the vehicle seat, a greater load-bearing capacity of the protection element is achieved by the improved fastening. It is achieved that the protection element is arranged fixedly in terms of displacement on the vehicle seat by the fastening hooks thus formed. In this case the resilient deformability of the tabs nevertheless permits a simple mounting of the protection element on the vehicle seat.

According to a disclosed embodiment, it may be provided that the two tabs of the tab pair are arranged spaced apart from one another. Thus, for example, it may be provided that one tab is assigned to a side edge and the other tab is assigned the opposing side edge of the protection element. Also, the tabs of the tab pair may be arranged in the vicinity of one another, for example, to grip two struts of the vehicle seat extending parallel to one another and arranged closely adjacent to one another.

It is further provided that one tab may be configured to be narrower than the other tab of the tab pair. Because the tabs are configured in different widths, a curved strut which extends in a U-shaped manner is able to be guided through both tabs of the tab pair and blocks the protection element on the strut in a stable manner.

According to a disclosed embodiment, it is provided that the one tab of at least one tab pair is configured in the other tab of the tab pair and forms the retaining portion. Thus when the other tab is bent outwardly from its resting position, the one tab is already bent therewith outwardly from the plane of the protection element. If the one tab is also subsequently bent outwardly from its resting position, for example, it may also be located parallel to the plane of the protection element. This results in further possibilities for the design of the fastening hook for fastening to the vehicle seat, in particular, to a strut of the vehicle seat. As a result it is possible for the retaining portion to engage behind the strut, an inadvertent release of the protection element from the vehicle seat being reliably prevented thereby.

Moreover, the protection element may comprise at least two equal tab pairs which are arranged parallel to one another, at the height of the protection element. Thus the tab pairs are located adjacent to one another on a horizontal plane of the protection element and/or in the installed state of the vehicle seat. As a result, it is ensured that the protection element on the vehicle seat does not tilt during operation. According to a disclosed embodiment, further tabs or tab pairs as have been described above are formed on/in the protection element.

The disclosed vehicle seat is characterized by the disclosed protection element. As a result, the aforementioned benefits are produced. Further benefits and optional features result from that which has been previously described and from the claims.

FIG. 1 shows in a simplified plan view a protection element 1 for a vehicle seat of a motor vehicle. The protection element 1 is of tarpaulin-like configuration and serves as a cover, in particular, in a backrest of the vehicle seat. To this end, the protection element 1 is arranged, for example, between a cushion or cushion cover and a lumbar support mechanism of the vehicle seat to protect the cushion or the cushion cover and also the user of the vehicle seat from hard components of the lumbar support mechanism and from sharp edges of the lumbar support mechanism and to dampen noise. The provision of tarpaulin-like protection elements as a backrest cover and/or a cover of a lumbar support mechanism is known in principle.

The present protection element 1 is produced from a resilient material which may be adapted to an adjustment of the lumbar support mechanism and ensure the greatest possible comfort for a user on the vehicle seat. Optionally, the protection element 1 is produced from a puncture-resistant (safety) material.

In this case in the plan view of FIG. 1 the protection element 1 has a substantially rectangular contour with two longitudinal sides and two broad sides configured to be shorter in comparison therewith. On one of the broad sides the protection element 1 has a fastening portion 2 which serves for fastening the protection element 1 to a vehicle seat as, for example, is shown in FIGS. 2 to 5.

The fastening portion 2 has a shape which differs from the rectangular shape of the protection element 1. To this end, the fastening portion 2 has two recesses 3 which are configured to oppose one another and which are spaced apart from the edge of the broad side, the protection element 1 being partially tapered in its width thereby. Thus the fastening portion 2 is more flexible in comparison with the remaining protection element 1. Moreover, the fastening portion 2 on the edge of its broad side has a central and arcuate indentation 4 which extends into the protection element 1 as far as the height of the recesses 3. As a result, two partial fastening portions 5 which are configured to be tab-shaped are produced in the fastening portion 2.

The fastening portion 2 also has four pairs 6, 7, 8 and 9 of tabs which are intended to be described in more detail hereinafter.

Initially, the design of the pairs 6 and 7, which are designed equally, is intended to be described with reference to the pair 6. The pair 6 has a first tab 10 and a second tab 11. The tabs 11 and 10 are configured in the protection element 1 by one respective cut-away portion, so that ultimately they form the cut-away tongues of the protection element 1. The respective cut-away portion in this case is configured to be arcuate so that the tabs 10, 11 have a substantially arcuate contour, in particular, a U-shaped contour. The cut-away portions have at their respective ends in each case a circular stress relief opening 12 which, when the respective tab 10, 11 is resiliently bent outwardly from the plane of the protection element 1 so that it protrudes from the remaining protection element 1, ensures that the forces acting on the protection element 1 in the region of the ends of the cut-away portion do not lead to the rupture of the protection element 1.

According to a disclosed embodiment, the tab 10 is configured to be wider than the tab 11, wherein the tab 11 is entirely located within the tab 10 and forms an additional retaining portion 29. In this case, the tabs 10, 11 are configured such that the tabs 10, 11, when they are located in their relaxed resting state in the plane of the protection element 1 and/or in the protection element 1, face in opposing directions with their free ends 13 and/or 14 which are able to be bent outwardly from the protection element 1. The tabs 10, 11 are also configured such that the tab 11 is configured centrally within the tab 10. The pair of tabs 6 and/or 9 in this case is configured in the protection element 1 such that it is located at the height of the recesses 3 in the protection element 1, wherein the stress relief openings 12 of the cut-away portions of the tabs 10 and 11 in each case are located at the same height as the protection element 1 and thus on a horizontal line and/or on a line parallel to the broad side of the protection element 1.

The pair 9 is configured corresponding to the pair 6, as already mentioned, so that the pair 9 also has tabs 10 and 11 which are configured and arranged as described above. The pair 9 is arranged spaced apart from the pair 6 between the recesses 3 and is located at the same height as the pair 6 so that the stress relief openings 12 of the cut-away portions and/or the stress relief openings 12 of the tabs 10 and 11 which are arranged in parallel are located in each case at the same height and/or on the same line.

The pairs 7 and 8 also have in each case two tabs 15, 16. Here the pairs 7 and 8 are configured in each case in one of the partial fastening portions 5. Moreover, the tabs 15 and 16 are configured by one respective cut-away portion in the protection element 1.

The cut-away portion of the tab 15 in this case is configured to be arcuate, wherein the arc has a substantially larger diameter in comparison with the width of the cut-away portion. Here, the cut-away portion of the tab 15 in contrast to the cut-away portions of the tabs 16, 11 and 12 may be designed in the present case as a slot, wherein alternatively the cut-away portion of the tab 15 could also be designed in the manner of the remaining cut-away portions with stress relief openings at the end. The tab 15 has, therefore, a free end 17 which in comparison with the tabs 11 and 10 may be bent outwardly from the protection element 1 to a lesser extent. The tab 15 is configured in this regard to be approximately as wide as the tab 10 but markedly shorter.

The tab 16 also has a substantially U-shaped cut-away portion, wherein the cut-away portion at the free end 18 of the tab 16 has a widening such that the tab 16 forms a widened tab head 19 which, therefore, is configured to be wider in comparison with the remaining tab 16 and, as a result, forms an additional retaining portion 30. In contrast to the pairs 6 and 9, the one tab 16 is not located inside the other tab 15 but instead the tab 16 is arranged spaced apart from the tab 17. In this case, however, in the initial position and/or in the relaxed resting state of the tabs 15, 16 the free ends 18 and 17 are also aligned to face in opposing directions. In this case, the tab 16 is not centrally aligned with the tab 15 but slightly offset thereto, so that the tab 16 and/or the center of the tab 16 is arranged closer to the central longitudinal axis (dashed-dotted line) of the protection element 1 than the center of the tab 15. As already mentioned, the pair 8 of tabs 15 and 16 is configured so as to correspond to the pair 7 of tabs 15 and 16. Finally, the pair of tabs 7 and 8 and/or 6 and 5 are mirror-symmetrical along the longitudinal central axis of the protection element 1.

By the design of the protection element 1, the protection element may be mounted on different vehicle seats in a simple manner without additional fastening mechanisms. In the resting state and/or in the initial state of the protection element 1, due to their cut-away portion the tabs are located in the protection element 1 so that their surfaces terminate flush with the surfaces of the protection element 1. As a result, for example, a plurality of protection elements 1 may be easily stacked on top of one another, by being placed on top of one another. In comparison with solutions in which the known protection elements have a permanently protruding fastening hook, beneficial storage is consequently ensured. Moreover, the protection element 1 is able to be integrated in a vehicle seat as is intended to be shown in the following examples.

Figure 2:
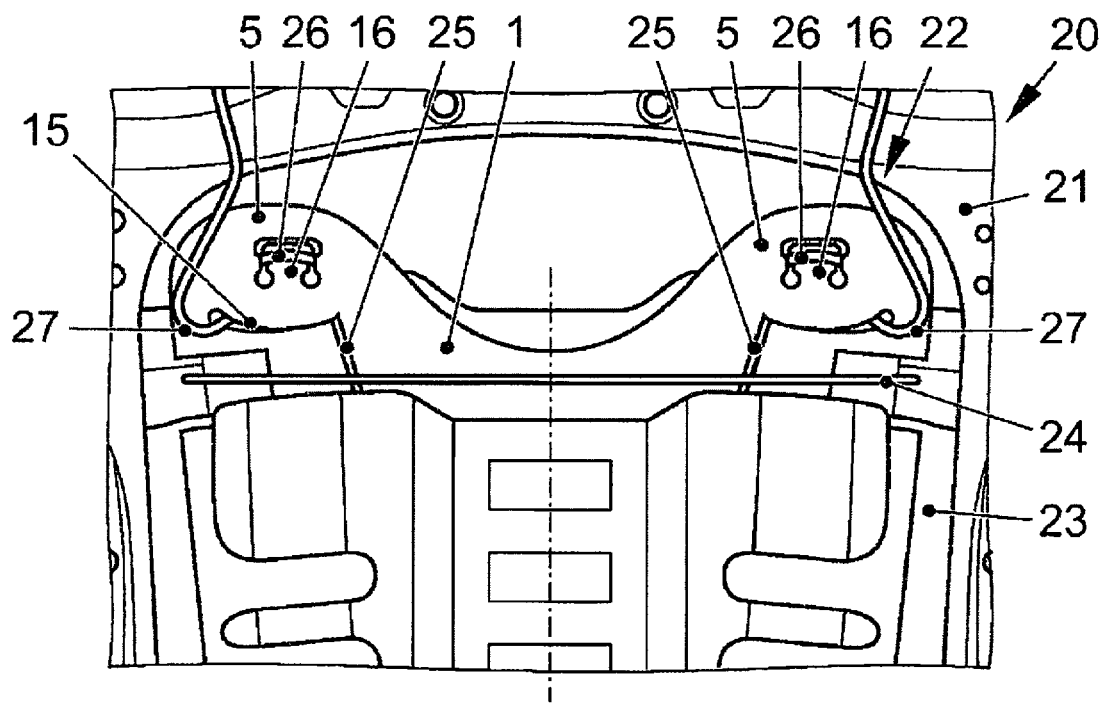

FIG. 2 shows in this connection a first exemplary embodiment of the mounted protection element 1. To this end, FIG. 2 shows a portion of a vehicle seat 20 in a plan view from the front, wherein of the vehicle seat 20 only a frame of a backrest 21 is shown in the present case. A strut structure 22 is arranged on the frame, the strut structure extending into an opening 23 formed by the frame. The strut structure 22 is configured to be at least partially resiliently deformable and the backrest 21 of the vehicle seat 20 formed by the frame provides resilience for the user. The strut structure 22 thus ultimately provides suspension for a cushion of the vehicle seat 20. The strut structure 22 in the present case has a horizontally extending transverse strut 24 which extends in this regard horizontally on the frame beyond the opening 23. Two vertical struts 25 are secured to the transverse strut 24, the vertical struts extending vertically upwardly in a serpentine or meandering manner in the direction of the upper end of the frame and being secured thereto. Due to the serpentine shape the vertical struts 25 in some regions obtain an S-shaped path, respectively with an upwardly facing rounded tip 26 and a downwardly facing rounded tip 27.

By using the pairs 7 and 8 of tabs 15 and 16, the protection element 1 is secured to the strut structure 22. To this end, the protection element 1 is mounted such that the tip 26 is initially pushed below the partial fastening portion 5 by resiliently bending the tab 15 outwardly. In this case, the tip 26 is pushed beyond the stress relief opening 12 of the cut-away portion of the tab 16. The tab 16 is bent outwardly toward the rear face of the protection element 1 and namely such that it engages the vertical strut 25 on the tip 26. The tab 15 is thus bent outwardly to the front and the tab 16 is bent outwardly to the rear from the plane of the protection element 1 and/or from the paper plane. The retaining portion 30 and/or the widened tab head 19 in this case is hooked to the tip 26 so that the protection element 1 is securely held on the strut structure 22. The tabs 15, 16 which are bent outwardly, in particular, the narrower tabs 16, thus form fastening hooks for fastening the protection element 1 to the vehicle seat 20 and/or in/to the backrest 21 thereof.

Figure 3:
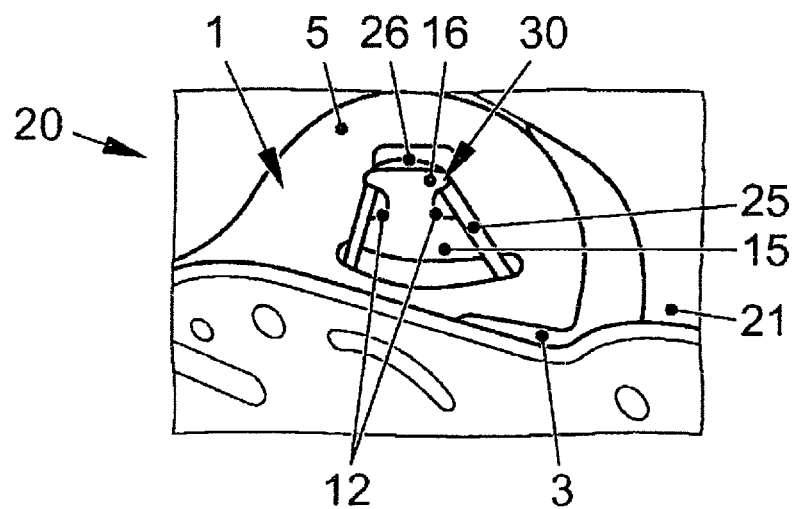

FIG. 3 shows an enlarged view of the partial fastening portions 5 in a view from the rear. In this case, the tab 16 which is bent outwardly to the rear and the tab 15 which is bent outwardly to the front may be identified clearly. The widened tab head 19 ensures the secure retention of the tab 16 to the rear of the vertical strut 25. The recesses 3 permit as a whole an increased flexibility of the partial fastening portions 5 so that they may be reliably adapted to the shape of the strut structure 22.

Figure 4:
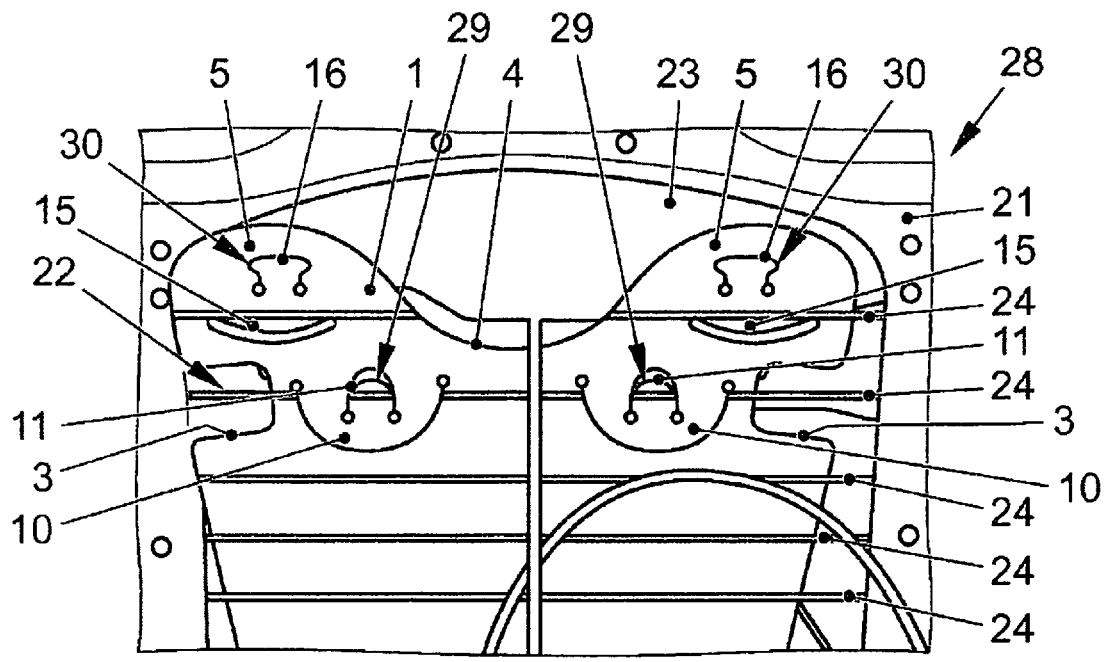

FIG. 4 shows a further exemplary embodiment in which the protection element 1 is integrated in a backrest 21 of a vehicle seat 28 which differs from the backrest 21 of the vehicle seat 20. Elements which are disclosed from the above exemplary embodiment are provided with the same reference numerals so that in this regard reference is made to the aforementioned description. Substantially only the differences are intended to be described hereinafter.

In contrast to the above exemplary embodiment, the strut structure 22 has a plurality of transverse struts 24 which extend spaced apart from one another horizontally over the opening 23 of the frame 21. For fastening the protection element 1 to the strut structure 22 in this case the pairs 6 and 9 are used. To this end, the tabs 10 in the image plane are bent outwardly to the front and the tabs 11 are bent outwardly to the rear. The tabs 10 are pushed over one of the transverse struts 24 so that the transverse strut 24 is located between the tab 10 and the protection element 1. The tabs 11 are bent to the rear and guided below the strut 24 to such an extent that they engage behind the same strut 24 as a retaining portion 29, the strut being covered by the tabs 10. As a result, the protection element 1 is blocked positively and securely to the strut structure 22 of the vehicle seat 28.

Figure 5:
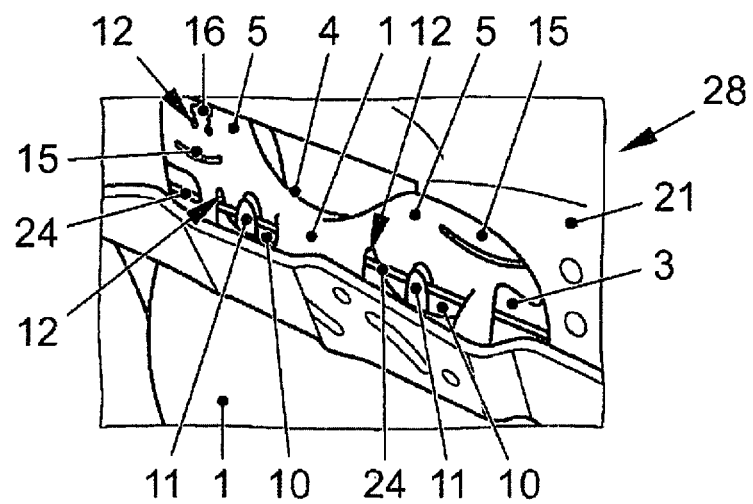

FIG. 5 shows in an enlarged view a plan view of the rear face of the protection element 1 in the vehicle seat 28. In this case, it may be clearly identified that the strut 24 is held between the tab 11 and the tab 10, on the one hand, and between the tab 10 and the protection element 1, on the other hand, so that the protection element 1 is limited both upwardly and downwardly in its freedom of movement, resulting in the secure fastening of the protection element 1 to the vehicle seat 28.

The tabs 10, 11, 15 and 16 described here, therefore, may be used individually or not used, depending on the application, i.e., depending on the vehicle seat 20 or 28 to which the protection element 1 is intended to be fastened. As soon as the tabs 10, 11, 15, 16 are bent outwardly from the plane of the protection element 1, in each case they form an individual fastening hook for blocking the protection element 1 on the strut structure 22. The tabs which are not bent outwardly from the plane of the protection element 1, and in this regard are also not used for fastening the protection element 1, thus remain in the plane of the protection element 1 so that the protection element 1 remains flat and/or planar, except for the portions in which the fastening takes place, and in this regard the protection element may be inserted into the constructional space of the respective vehicle seat 20, 28. A conflict is avoided with other elements in the constructional space.

The protection element 1 requires no further fastening elements and provides for lower storage costs by reducing the number of variations and by the flat and/or tarpaulin-like construction in the raw state, lower handling costs by reducing the number of variations, improved efficiency of the tools during production, reduced mounting time and lower direct material costs. The protection element 1 is beneficial when used as a backrest cover or lumbar region cover.

LIST OF REFERENCE NUMERALS

1 Protection element
2 Fastening portion
3 Recess
4 Indentation
5 Partial fastening portion
6 Pair
7 Pair
8 Pair
9 Pair
10 Tab
11 Tab
12 Stress relief opening
13 End
14 End
15 Tab
16 Tab
17 End
18 End
19 Tab head
20 Vehicle seat
21 Frame
22 Strut structure
23 Opening
24 Transverse strut
25 Vertical strut
26 Tip
27 Tip
28 Vehicle seat
29 Retaining portion
30 Retaining portion

The invention claimed is:

1. A protection element for a backrest of a vehicle seat comprising:
    at least one fastening hook configured integrally with the protection element for fastening the protection element to a strut structure of the vehicle seat;
    at least one tab configured to be bent outwardly from a plane of the protection element by a free end for forming the fastening hook,
    wherein the tab comprises a retaining portion for retaining the tab on the strut structure,
    wherein the tab is cut away in an arcuate shape and a free end of the tab comprises a tab head having a corresponding arcuate shape, and
    wherein the tab head is wider than an adjacent portion of the tab as a result of the corresponding arcuate shape.

2. The protection element of claim 1, wherein the tab is bent outwardly or configured to be bent outwardly in a resilient manner.

3. The protection element of claim 1, wherein the protection element is made from a resiliently deformable material and/or from a puncture-resistant material.

4. The protection element of claim 1, wherein the tab is cut away in a U-shaped or V-shaped manner.

5. The protection element of claim 1, wherein the tab head is wider than an extent of the remaining tab and wherein the tab head forms the retaining portion.

6. The protection element of claim 1, further comprising at least one tab pair having two cut-away tabs, wherein free ends of respective opposing tabs of the at least one tab pair face in opposing directions in their relaxed resting state.

7. The protection element of claim 6, wherein the two tabs of the respective tab pair are arranged spaced apart from one another.

8. The protection element of claim 6, wherein the one tab is narrower than the other tab of the pair of tabs.

9. The protection element of claim 6, wherein the one tab of the at least one tab pair is configured in the other tab of the same tab pair and is formed in a retaining portion of the other tab.

10. The protection element of claim 1, further comprising at least two equal tab pairs arranged parallel to one another, at the height of the protection element.

11. A vehicle seat for a motor vehicle comprising a backrest, wherein the backrest comprises a resiliently deformable protection element for covering a lumbar support mechanism in the backrest, and comprising at least one fastening hook configured integrally with the protection element for fastening the protection element to a strut structure of the vehicle seat, at least one tab configured to be bent outwardly from a plane of the protection element by a free end for forming the fastening hook,
   wherein the tab comprises a retaining portion for retaining the tab on the strut structure,
   wherein the tab is cut away in an arcuate shape and a free end of the tab comprises a tab head having a corresponding arcuate shape, and
   wherein the tab head is wider than an adjacent portion of the tab as a result of the corresponding arcuate shape.

12. The vehicle of claim 11, wherein the tab is bent outwardly or configured to be bent outwardly in a resilient manner.

13. The vehicle of claim 11, wherein the protection element is made from a resiliently deformable material and/or from a puncture-resistant material.

14. The vehicle of claim 11, wherein the tab is cut away in a U-shaped or V-shaped manner.

15. The vehicle of claim 11, wherein the tab head is wider than an extent of the remaining tab and wherein the tab head forms the retaining portion.

16. The vehicle of claim 11, wherein the protection element further comprises at least one tab pair having two cut-away tabs, wherein free ends of respective opposing tabs of the at least one tab pair face in opposing directions in their relaxed resting state.

17. The vehicle of claim 16, wherein the two tabs of the respective tab pair are arranged spaced apart from one another.

18. The vehicle of claim 16, wherein the one tab is narrower than the other tab of the pair of tabs.

19. The vehicle of claim 16, wherein the one tab of the at least one tab pair is configured in the other tab of the same tab pair and is formed in a retaining portion of the other tab.

20. The vehicle of claim 16, wherein the protection element further comprises at least two equal tab pairs arranged parallel to one another, at the height of the protection element.

* * * * *